Patented Apr. 14, 1931

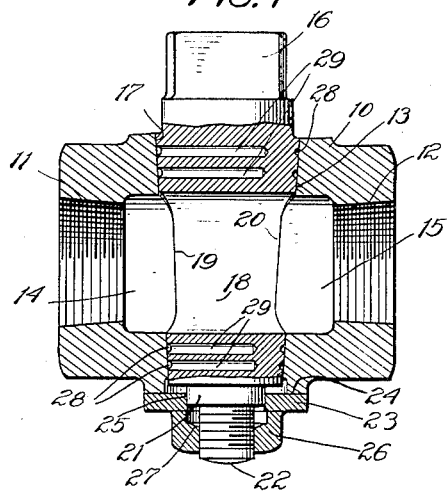
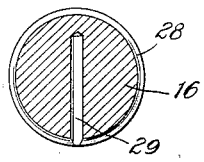
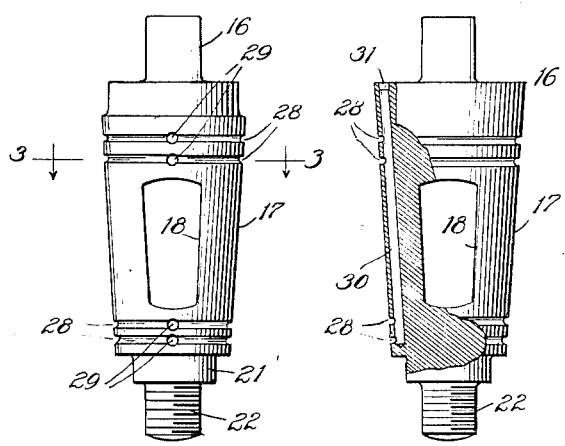

1,800,554

UNITED STATES PATENT OFFICE

GARNET W. McKEE, OF ROCKFORD, ILLINOIS

COCK

Application filed September 10, 1928. Serial No. 304,985.

The present invention relates to improvements in cocks or valves, and particularly those adapted for use in gas lines.

The primary object of the invention resides in the provision of a new and improved cock which will not leak, particularly at the ends of the key or plug, which will not stick or set after it has been in service for a time, and which is simple and inexpensive in construction and easy to machine.

The prevention of leakage is of primary importance. To prevent leakage it is common practice to grind or turn the key and ream or grind the tapered bore in which it is adapted to be fitted, so as to obtain smooth coacting surfaces. Grease is provided between the coacting surfaces for the purpose of effecting a fluid tight seal and for lubrication. The grease commonly used for this purpose dries out, and also is absorbed into the pores of the metal which is usually cast iron, thereby causing sticking or freezing of the cock. This is particularly true in gas cocks since in most instances they are not operated over long periods of time. Operating a cock after sticking or freezing of the coacting surfaces is often impossible without breaking the key, and in most instances requires considerable force, or hitting or tapping the small end of the key to slightly unseat the latter. This invariably results in a leaky cock.

An important object of the present invention therefore resides in the provision of a new and improved cock comprising novel means for lubricating the coacting surfaces over a substantial period of time so as to prevent sticking or freezing.

Another object resides in the provision of a novel cock having one or more grooves in either of both of the coacting surfaces at each end of the key, and having a non-drying lubricating oil in the grooves. A film of lubricant between smooth closely fitting surfaces tends to prevent leakage but may give way in spots. The grooves break up any leak lines in the film of lubricant and thereby effectively prevent leakage. They also collect lubricant and thus improve lubrication.

A more specific object resides in the provision of a cock having a key with one or more peripheral grooves in each end, and with interior resorvoir means communicating with the grooves and adapted to contain a surplus supply of lubricant.

Further objects and advantages will become apparent as the description proceeds.

In the accompanying drawings, Figure 1 is a longitudinal sectional view of a cock embodying the features of my invention.

Fig. 2 is an elevational view of the cock key.

Fig. 3 is a sectional view taken along line 3—3 of Fig. 2.

Fig. 4 is a longitudial sectional view of a modified form of the cock.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more specifically to the drawings, in its exemplary embodiment the invention comprises a suitable casing or body 10. The opposite ends of the body are tapped as indicated at 11 and 12 for the reception of suitable pipes (not shown). Opening centrally through the body 10 is a transverse bore 13, the surface of which preferably is reamed or ground smooth. A pair of elongated ports 14 and 15 open from opposite sides of the bore 13 into the ends of the body 10.

A plug or key 16 having a smooth surface 17 fits snugly into the bore 13 and is rotatable therein. Preferably, the bore 13 and the key 16 are tapered. The key 16 is formed with a central passage 18 opening laterally therethrough and terminating at the surface 17 in elongated ports 19 and 20 adapted to be moved into and out of registration of the ports 14 and 15.

The small end of the key 16 is reduced in size to provide a shoulder 21, and is formed integrally with a threaded stem 22 projecting beyond the body 10. A suitable washer 23 fits against a machined surface 24 on the body 10 at the lower end of the bore 13, and has a central aperture 25 fitting over the shoulder 21. A nut 26 is threaded onto the stem 22, and against the washer 23 to hold the key 16 snugly in the bore 13. The inner surface of the nut 26 is formed with a recess 27 slightly larger in diameter than the shoulder 21 so as to insure a good clamp even though the shoulder projects beyond the outer surface of the washer 23.

In use, a lubricant is provided between the coacting surfaces of the bore 13 and the key 16. Means is provided which will interrupt this film of lubricant so as to break up any leak lines that may be formed. Preferably, this means comprises a plurality of narrow grooves 28. In gas cocks, prevention of leakage past the ends of the key 16 is of primary importance. This also is where leakage is most likely to occur, due to errors in the tapers of the bore 13 and the key 16. Hence, the grooves 28 are formed in the ends of the key 16, in the present instance two spaced grooves being provided at each end. These grooves effectively prevent leakage past the ends of the key 16, and also serve to collect lubricant to improve lubrication between the surfaces.

To provide constant lubrication over a long period of time, reservoir means is provided. In the present instance, this means is formed in the key 16. Referring to Figure 1, the reservoir means comprises a bore 29 extending inwardly from each notch 28, and preferably diametrically almost through the key.

In assembling the cock, the key 16 is positioned with the bores 29 opening upwardly. The bores 29 then are filled with a non-drying lubricating oil, as distinguished from a grease. While the invention is not limited in certain of its aspects to the use of an oil of this character, I attach considerable importance to the use of such oil, particularly where it is filled into the reservoir means from which it should flow as required. The cock then is inserted into the bore 13, secured in place, and turned to permit oil from the bores 29 to enter the grooves 28 so as to provide a seal and to lubricate the coacting surfaces.

The oil will not dry or absorb into the metal. By reason of the reservoir means, an ample supply is available. The seal will remain effective over a long period of time and will prevent sticking or freezing.

The cock shown in Fig. 4 is generally similar to the cock shown in Fig. 1, and hence like reference characters are used to designate similar parts. In the modified form, the reservoir means comprises an elongated bore 30 extending longitudinally of the key 16 and opening to the grooves 28. When the bore 30 is filled with oil, it is sealed at the outer end by any suitable means, such as a plug 31. To fill in the oil, the grooves 28 and the bore 30 may first be evacuated.

I claim as my invention:—

1. A cock having, in combination, a body having a bore with a port opening laterally therefrom, a key rotatably mounted in said bore and having a passage adapted to be moved into and out of communication with said port, an oil groove formed in the periphery of said key, and a bore extending inwardly from said groove, the inner end of said last mentioned bore being closed and terminating within said key, said last mentioned bore being adapted to contain a lubricant.

2. A cock having, in combination, a body having a smooth taper bore with a port opening laterally therefrom, a smooth taper key fitting rotatably in said bore, said taper key having a central passage opening in a port at the surface thereof for movement into and out of registration with said first mentioned port, a pair of spaced annular grooves formed in each end of the tapered surface of said key and beyond the ends of said last mentioned port, said grooves being out of communication with each other, and a plurality of bores in said key, one extending inwardly from each groove.

3. A cock having, in combination, a body having a taper bore with a port opening laterally therefrom, a taper key fitting rotatably in said bore, said taper key having a passage opening in a port for movement into and out of registration with said first mentioned port, a plurality of noncommunicating spaced annular grooves formed in each end of the tapered surface of said pin and beyond the ends of said last mentioned port, a plurality of non-communicating recesses in said key one extending inwardly from each of said grooves, and a non-drying lubricating oil in said recesses.

4. A cock having, in combination, a body having a smooth taper bore with a port opening laterally from said bore, a taper pin having a smooth peripheral surface fitting snugly and rotatably in said bore, said taper pin having a central passage opening in a port at the surface thereof for movement into and out of registration with said first mentioned port, a pair of spaced closed annular grooves formed in each end of the tapered surface of said pin beyond the ends of said last mentioned port, said grooves being out of communication with each other and the surface between said grooves being continuous, the intermediate surface of the pin proximate to said last mentioned port being uninterrupted except by said ports, and a plurality of bores formed in said pin substantially in a common longitudinal plane, said bores terminating within said pin and each communicating with one of said respective grooves.

5. A cock having, in combination, a body having a smooth taper bore with a port opening laterally from said bore, a taper pin having a smooth peripheral surface fitting snugly and rotatably in said bore, said taper pin having a central passage opening in a port at the surface thereof for movement into and out of registration with said first mentioned port, a plurality of spaced labyrinth grooves formed in the peripheral surface of said pin, said grooves being out of communication with each other and separated by a continuous bearing surface, and a plurality of independent recesses within said pin each in communication with one of said grooves, said recesses being adapted to be filled simultaneously with a supply of liquid lubricant.

6. A cock having, in combination, a body having a smooth taper bore with a port opening laterally from said bore, a taper pin having a smooth peripheral surface fitting snugly and rotatably in said bore, said taper pin having a central passage opening in a port at the surface thereof for movement into and out of registration with said first mentioned port, a closed labyrinth groove formed in the tapered surface of said pin beyond the ends of said last mentioned port, said groove being separated from said port by a substantial portion of the bearing area of said pin, the intermedate surface of sad pin proximate to said last mentioned port being uninterrupted, and a closed bore within said pin communicating with said groove at its point of intersection therewith, the inner end of said bore extending substantially beyond the center of said pin.

In testimony whereof, I have hereunto affixed my signature.

GARNET W. McKEE.